United States Patent
Matsuda et al.

[11] Patent Number: 5,436,534
[45] Date of Patent: Jul. 25, 1995

[54] LIGHTING DEVICE

[75] Inventors: Osamu Matsuda; Naoto Ogimoto, both of Okayama; Hiroyoshi Iwashima, Aichi, all of Japan

[73] Assignee: Ken Hayashibara, Okayama, Japan

[21] Appl. No.: 171,842

[22] Filed: Dec. 22, 1993

Related U.S. Application Data

[63] Continuation of Ser. No. 848,435, Mar. 9, 1992, abandoned.

[30] Foreign Application Priority Data

Dec. 6, 1991 [JP] Japan ................................. 3-360400

[51] Int. Cl.6 .............................................. G06F 1/00
[52] U.S. Cl. ............................... 315/291; 315/200 R; 315/205; 315/DIG. 7
[58] Field of Search ........................ 313/643, 108, 112; 315/291, 200 R, 205, DIG. 7; 363/132

[56] References Cited

U.S. PATENT DOCUMENTS

| | | | |
|---|---|---|---|
| 2,115,480 | 4/1938 | Claude | 313/643 |
| 4,001,637 | 1/1977 | Gray | 315/200 R |
| 4,752,719 | 6/1988 | McEwan | 315/200 R |
| 5,126,636 | 6/1992 | Masaki | 315/291 |

FOREIGN PATENT DOCUMENTS

| | | |
|---|---|---|
| 0470750 | 12/1992 | European Pat. Off. . |
| 4212290 | 8/1992 | Japan . |

*Primary Examiner*—Robert J. Pascal
*Assistant Examiner*—Haissa Philogene
*Attorney, Agent, or Firm*—Browdy and Neimark

[57] ABSTRACT

Disclosed is a lighting device to emit a light which substantially does not elevate the ACTH level in human blood. Such a light hardly causes stresses when used in illumination. This renders the lighting device very useful in comfortable illuminated spaces for visual tasks.

9 Claims, 5 Drawing Sheets

LEFT    RIGHT

OCCIPITAL REGION

FIG. 4

LEFT　　　　　　　　　　　　RIGHT

OCCIPITAL REGION

FIG. 5

LEFT　　　　　　　　　　　RIGHT

OCCIPITAL REGION

LIGHTING DEVICE

This application is a continuation of application Ser. No. 07/848,435 filed Mar. 9, 1992, now abandoned.

BACKGROUND OF THE INVENTION

1. Field of the Invention

This invention relates to a lighting device, in particular, to a lighting device to emit a light which hardly causes stress when used in illumination.

2. Description of the Prior Art

In the case of doing visual tasks, the use of inappropriate illumination is causative of stress. For example, when workers are involved in a long-time video display terminal VDT task or chemical analysis, the resultant hypertonic in their optic nerves causes stresses which may lead in extreme cases to metabolic and/or mental disorder. In particular, VDT task is very causative of stress even when the operation time is not so long, thus the operators come to usually complain of headache, inappetence and/or languor. Because of these, in visual tasks accompanying tensions in the optic nerve, the use of a less stress-causative lighting device is indispensable.

Although with the spread of computers, discussions have been made on illuminations which are feasible in VDT task for less languor, no effective illumination is available which is worthy of special selection. Past discussion on illuminations have been focused on their clarity and color rendering properties and no discussion has been actually made on the relationship between illumination and stress.

SUMMARY OF THE INVENTION

This invention is to provide a lighting device which hardly causes stress when used in illumination. To develop such a lighting device, we studied at first several parameters to quantify stresses due to visual tasks.

We studied the relationship between illumination and stress particularly with respect to adrenocorticotrophic hormone (abbreviated hereinafter as "ACTH") which is known in internal medicine as a method to clinically test patients with Cushing syndrome or tumor of the adrenal gland. As a result, we found that the occurrence of stresses elevates the ACTH level in human blood. Also was found that the ACTH level in human blood elevates as stress advances, as well as that illuminations can be quantified for their stress causability by determining the ACTH level in human blood.

ACTH is a peptide hormone of 39 amino acids, molecular weight of about 4,500 daltons, which is secreted by the anterior lobe of the pituitary gland, stimulating the production and secretion of steroid hormones in the adrenal cortex. It is known that the ACTH level in human blood has a diurnal variation where the ACTH level maximizes early morning, then gradually decreases towards midnight.

Based on these findings, we screened various luminous sources and found that lights which substantially do not elevate the ACTH level in human blood hardly cause stress when used in illumination, as well as that such a light is suitable in lighting devices directed to comfortable illuminated spaces.

In particular, this invention relates to a lighting device to emit a light which substantially does not elevate the ACTH level in human blood.

DETAILED DESCRIPTION OF THE INVENTION

The wording "substantially does not elevate the ACTH level in human blood" means that when tasks including visual task are loaded under light illumination, the ACTH level in human blood substantially does not change before and after loading the tasks. Speaking more concretely, for example, when determined by the below described immunoradiometric assay using anti-ACTH antibody, the elevation due to about 60-minute visual task is not more than about 4%, desirably, not more than about 2%, provided that the ACTH level immediately before loading the visual task is regarded as 100.

Now explaining more concretely the constitutive elements of this invention, the lighting device of this invention comprises a luminous source capable of emitting a light which substantially does not elevate the ACTH level in human blood, and a power source to energize the luminous source.

Incandescent lamps are suitable for such a luminous source, and any incandescent lamp can be used in this invention as long as it emits a light which substantially does not elevate the ACTH level in human blood. Particular incandescent lamps are, for example, xenon gas-enclosed incandescent lamp, krypton gas-enclosed incandescent lamp and argon gas-enclosed incandescent lamp which are all excellent in luminous characteristics, easily handleable and manufactureable at low costs.

By the way, there is a close relationship between the stress causability of lights and the ultraviolet components in the lights. We found that lights which are emitted by incandescent lamps and richer in ultraviolet rays, in particular, those with a wavelength of about 290–400 nm hardly cause stress when used in illumination. With this reason, in any type of incandescent lamps, it is preferable to use glass bulbs with an elevated transmittance for ultraviolet rays, for example, those of soft glass or quartz. For example, when incandescent lamps as luminous source are energized at a dc voltage exceeding its rating, desirably, in the range of about 105–130% thereof, the optical energy ($W/nm/cm^2$) within the above described wavelength range increases to about 2- to 10-folds, desirably, about 2- to 7-folds than in the case of energizing at their rated voltages.

Among various incandescent lamps, both xenon gas-enclosed incandescent lamp wherein a composition consisting essentially of xenon gas and nitrogen gas is enclosed in a glass bulb bearing a tungsten filament, and krypton gas-enclosed incandescent lamp wherein a composition comprising krypton gas and nitrogen gas is enclosed in a similar glass bulb are superior as the luminous source in this invention because such an incandescent lamp is extremely long in life expectancy and easily allowed to emit a light which substantially does not elevate the ACTH level in human blood.

In the case of xenon gas-enclosed incandescent lamp, the composition to be enclosed in glass bulb usually contains xenon gas in an amount exceeding about 15% by volume but not exceeding about 80% by volume, desirably, in the range of about 20–75% by volume dependently on rated voltage, rated wattage and quality and finishing of the glass bulb to be used. To allow xenon gas to sufficiently exhibit its desirably luminous characteristics and extended life expectancy, it is desirable to maximize the amount of xenon gas while keeping arc starting voltage in an adequately high level. Such a composition is usually enclosed in an amount which brings the internal pressure in glass bulbs to about 700–800 torr when in incandescent state.

To allow the above described luminous sources to emit the objective light, they are usually energized at a voltage exceeding their rating, desirably, in the range of about 105–130% thereof, more desirably, at a dc voltage. Energization at a voltage outside the range tends to substantially elevate the ACTH level in human blood even when the energizing voltage is dc, thus hindering the attainment of the objective. In particular, when energizing voltage is lower than the above described range, the temperature of filament decreases and the infrared components in the emitted light increase, resulting in hypertonics in the optic nerve which are causative of stress. While, when energizing voltage exceeds the range, although both total flux and color temperature remarkably increase, an increased glare excessively stimulates the users' optic nerves, accelerating the occurrence of stress. Synthetically considering these and the fact that excessive energizing voltages unfavorably shorten the life expectancy of incandescent lamps, the above described voltage range would be best. In this case, the total flux is usually set in the range of about 600–1,300 lumens dependently on uses.

Now explaining the power source to energize incandescent lamps at such a voltage, any power source can be used in this invention as long as it can supply such a voltage to incandescent lamps. For example, incandescent lamps, rated voltage of 100 or 110 V, rated wattage of 40–100 W, are energized at a dc voltage of about 105–140 V which is obtained by converting an ac from ac sources such as standard ac line into dc using rectifier circuitries bearing smoothing means such as capacitor.

Particular preferable power sources are constructed as follows:

(i) Usual power sources consisting essentially of a rectifier circuitry to convert ac into dc (ii) Switching power sources comprising a rectifier circuitry to convert ac into dc; a switching element capable of repeating ON/OFF operations at high speed and having a main current path connected with an output terminal of the rectifier circuitry; a smoothing circuitry connected with the main current path of the switching element so as to convert the high-frequency output voltage therefrom into dc; a feedback amplifier circuitry to compare the output voltage with a standard voltage; and a pulse-width modulation circuitry to modulate the pulse width of signals from the feedback amplifier circuitry so as to control the switching element in ON/OFF manner (iii) Phase control power sources comprising a rectifier circuitry to convert ac into dc, the rectifier circuitry having an input terminal connected with an ac source and also an output terminal connected with an incandescent lamp; a controlled rectifier having a main current path connected between the ac source and rectifier circuitry; and a phase control circuitry having an output terminal connected with a control electrode of the controlled rectifier so as to control its conduction based on the time interval between zero-crossovers in the ac source Power sources as disclosed, for example, in Japanese Patent Kokai No.193,398/86, No.185,516/87 and No.88,792/88 are suitable for type (i) power source. Power sources as disclosed, for example, in Japanese Patent Application No. 55,743/91 are suitable for type (ii) power source.

Preferable type (iii) power sources are those which comprise a full-wave rectifier circuitry to convert ac into dc, the full-wave rectifier circuitry having an input terminal connected with an ac source and also an output terminal connected with incandescent lamp(s); a bidirectional controlled rectifier having a main current path connected between the ac source and full-wave rectifier circuitry; and a microcomputerized phase control circuitry having an output terminal connected with a control electrode of the bidirectional controlled rectifier so as to control its conduction based on the time interval between zero-crossovers in the ac source. This type of power sources exhibit an extremely stable phase control and lamp dimming functions can be easily imparted thereto. The use of microcomputerized phase control circuitries reduce the elements in electric constructive parts in lighting devices and this facilitates the size and cost reduction of high-performance lighting devices.

In ,every type of power sources as described above, one can provide a circuitry to limit inrush currents which may flow into filament and/or smoothing means immediately after switch-on, and/or a circuitry to limit arc discharge currents which may flow into the current path including incandescent lamp when its filament burns out. Also in this case, type (iii) power sources more effectively limit these inrush and arc discharge currents with simpler circuit constructions when the phase control circuitry is added with a soft start function and arranged to interlock with a circuitry which detects abnormal currents in the circuit including incandescent lamp.

The lighting device of this invention can be prepared into suitable shapes and arrangements to meet to its final use.

In particular, to illuminate the interior and exterior spaces of housings and buildings, for example, detached houses, apartment houses, multiple houses, libraries, schools, studios, beauty-salons, hospitals, factories including plant and animal factories, company buildings, office, hotels including "ryokan (Japanese-style hotel)", restaurants, halls including banquet hall, wedding hall, conference hall, concert hall, stores and shops including department store and supermarkets, museums including art museum, airplanes, vehicles, swimming pools, gymnasiums, sports grounds, cattle sheds, poultry houses and fish farms, the above described luminous source and power source therefor are prepared into table or desk lighting devices, for example, adjustable lamp, desk lamp, hurricane lamp, table lamp and mini lamp, or into indoor or outdoor lighting devices, for example, ceiling fixture, down lamp, wall fixture, pendant, chandelier, swag lamp, floor lamp, garden lamp and gate lamp, which are then mounted or placed, for example, in study, studio, children's room, bed room, living room, dining room, kitchen, toilet room, washroom, bath room, passage, stairs, balcony, porch, reading room, school room, hall, lobby, waiting room, treating room, surgery, control room, office room, drawing room, laboratory, lounge, guest room, clerk room, cooking room, operating or driving room and cultivating room in such a housing or building.

In much more systematic uses of the lighting device according to this invention, one or more unitized lighting devices of this invention are provided in appropriate place(s) in such a housing or building, and then subjected to one or more wire or wireless control methods such as individual wiring method, personal wiring multiplex method, telephone line method, power line carrier method, optical fiber method, electric wave control method, light control method, ultrasonic control method and acoustic control method using appropriate lighting control systems bearing, for example, dimming and switching circuitries. Thus, a plurality of lighting units of this invention become susceptible of lighting pattern control, time schedule control, daylight-interlocking control, wall switch control, centralized control and/or dimming control. This is very useful in interior and exterior illuminations in large-scale housings and buildings. Particularly in household lighting, one or more lighting devices of this invention can be systematically controlled together with other electric equipments by incorporating the lighting device(s) into home bus system. In such a use, lighting devices bearing the above described type (ii) or type (iii) power source are more suitable because of the facts that they readily energize a plurality of luminous sources, that they readily supply a large power, and that their size and weight can be easily reduced.

This invention will be explained hereinafter in conjunction with the accompanying Figures.

BRIEF DESCRIPTION OF THE ACCOMPANYING FIGURES

Throughout the Figures, reference numeral 1 designates incandescent lamp; 2, abnormal current-detecting circuitry; 3, microcomputer; AC, ac source; DCR, bidirectional controlled rectifier; D1–D3, diodes; C1–C2, capacitors; R1–R4, resistors; and VR, variable resistor for lamp dimming.

DESCRIPTION OF THE PREFERRED EMBODIMENT

Figure 1:
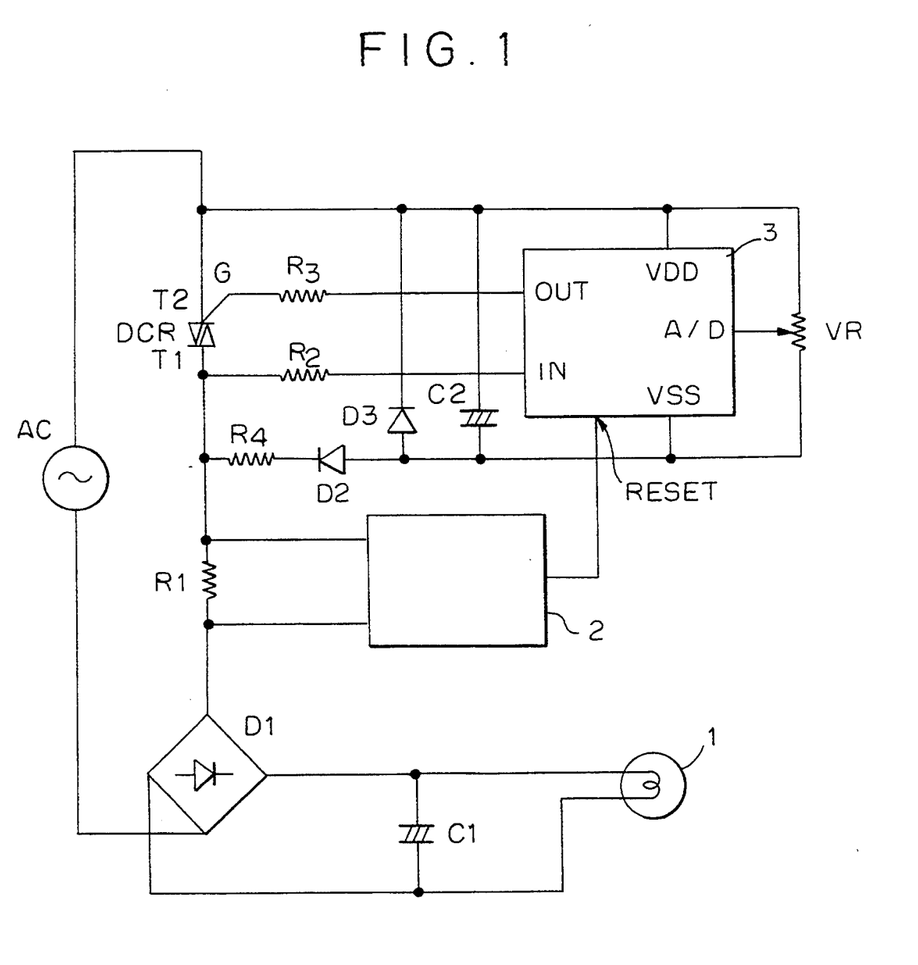
FIG. 1 is a circuit of the electric constitutive part of an embodiment according to this invention.

FIG. 1 shows an electric circuit of the electric constitutive part of an embodiment according to this invention.

In the Figure, D1 designates a bridge diode and its input terminals are connected with an ac source AC such a standard ac line. Between the bridge diode D1 and ac source AC are provided a main current path of a bidirectional controlled rectifier DCR and a resistor R1. Output terminals of the bridge diode D1 are connected in parallel with a capacitor C1 as smoothing means and one or more incandescent lamps 1.

The resistor R1 is to detect abnormal currents which may occur in the main current path and both ends of the resistor R1 are connected with input terminals of an abnormal current-detecting circuitry 2.

The reference numeral 3 designates a microcomputer to phase-control the bidirectional controlled rectifier DCR, which is usually available in IC tip form. The microcomputer 3 has zero-crossover detection function which finds zero-cross in the ac source AC and measures the time interval between zero-crossovers to determine the frequency of the ac source AC, a phase control function which supplies to a control electrode G of the bidirectional controlled rectifier DCR trigger signals where the phase angle gradually increases at a prescribed rate, and an analogue/digital conversion function which sets the phase angle in association with an external variable resistor for lamp dimming.

An ac signal input terminal IN of the microcomputer 3 is connected with a T1 terminal of the bidirectional controlled rectifier DCR through a resistor R2 so that the microcomputer 3 detects zero-crossovers in the ac source AC based on the voltage at the T1 terminal. While a trigger signal output terminal OUT of the microcomputer 3 is connected with the control electrode G of the bidirection controlled rectifier DCR through a resistor R3 so that the microcomputer 3 supplies trigger signals to the control electrode G through the resistor R3. A dimming signal input terminal A/D of the microcomputer 3 is connected with a sliding contact of a variable resistor VR for lamp dimming so that the analogue/digital conversion function sets the phase angle of the trigger signals based on the position of the sliding contact. Fixed contacts of the variable resistor VR are connected with power source terminals VDD and VSS of the microcomputer 3. The power source terminals VDD and VSS are connected with the T1 and T2 terminals of the bidirectional controlled rectifier DCR through a resistor R4 and a diode D2. The power source terminals VDD and VSS are also connected with a voltage-regulating diode D3 and a capacitor C2 in parallel, and the voltage across the T1 and T2 terminals is supplied to the diode D2 through the resistor R4 for rectification, smoothed by the capacitor C2, stabilized by the voltage-regulating diode D3 and supplied to the microcomputer 3. An output terminal of the abnormal current-detecting circuitry 2 is connected with a resetting terminal RESET of the microcomputer 3 so that when a resetting signal is supplied from the abnormal current-detecting circuitry 2, the phase control function stops to supply trigger signals, thus the bidirectional controlled rectifier DCR is brought into nonconduction.

Figure 2A:
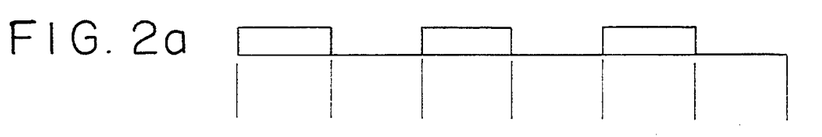
FIGS. 2a-2e are waveform charts as found in the embodiment in FIG. 1.
Figure 2B:
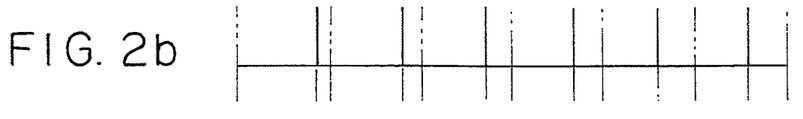
Figure 2C:
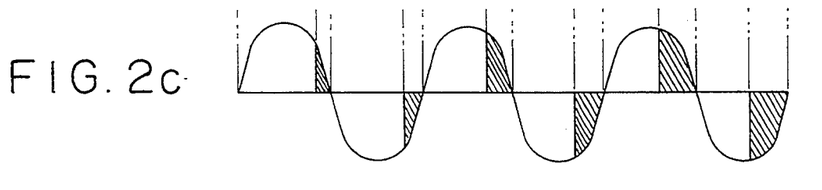
Figure 2D:
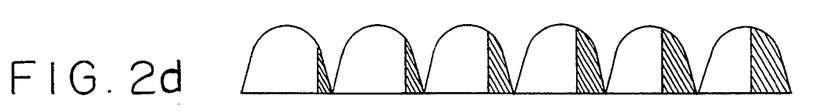
Figure 2E:
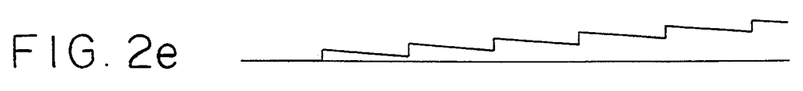

Now explaining the operation of this embodiment, upon switch-on, the microcomputer 3 detects forms pulses as shown in FIG. 2a based on zero-crossovers detected with the zero-crossover detection function and then thus determines the frequency of the ac source AC utilizing the time interval of the zero-crossovers. Thereafter, the microcomputer 3 supplies to the control electrode G of the bidirectional controlled rectifier DCR trigger pulses which delay by a prescribed time with respect to the rising and decaying edges in the ac source AC, and the bidirectional controlled rectifier DCR is energized by the trigger pulses. As shown in FIG. 2b, the phase angle of the trigger pulses first appears in a small level, then gradually advances to a larger level over a prescribed time period. Because of this, the current across the main current path of the bidirectional controlled rectifier DCR shows a waveform where the current magnitude increases in time course as shown in FIG. 2c. At this time, the waveform of the rectified current across the diode bridge D1 changes as shown in FIG. 2d with the dark shading. The rectified output of the diode bridge D1 is smoothed by the capacitor C1 and the incandescent lamp 1 is energized at a voltage whose magnitude gradually increases in time course as shown in FIG. 2e. Generally, when the frequency of ac source is changed, then the voltage across the capacitor C1 significantly changes. In this embodiment, the voltage across the capacitor C1 is in consistent level independently of the frequency of the ac source AC because when the frequency is 50 Hz, the microcomputer 3 automatically adjusts the phase angle of trigger signals to a level larger than in the case of 60 Hz.

The voltage across the incandescent lamp 1 which has gradually increased over a prescribed time period after switch-on is fixed to a constant level as determined by the variable resistor VR. Regarding the effective value of the ac source as 100%, the voltage across the incandescent lamp 1 can be changed in the range of about 20–130% by operating the variable resistor VR.

Thus, by the use of this embodiment, the dc voltage to energize the incandescent lamp 1 stepwisely and gradually increases from zero to a prescribed constant level. Because of this, when the resistance of filament upon switch-on is lower than that in incandescent state, no inrush current flows into the filament, thus the reduction in life expectancy of the incandescent lamp 1 due to inrush currents is effectively prevented.

If the filament of the incandescent lamp 1 burns out during its use, an arc discharge occurs between the resultant filament gap and this arises in the current path including the incandescent lamp 1 a large current which may damage or destroy circuit elements. In this embodiment, dependent on the resistant value of the resistor R1, if such an arc discharge current occurs, an abnormal voltage of up to several volts arises across the resistor R1. The abnormal current-detecting circuitry 2 detects such an abnormal voltage across the resistor R1 and then sends a resetting signal to the microcomputer 3. Immediately after receiving this signal, the microcomputer 3 receives suspends trigger pulses to the bidirectional controlled rectifier DCR to bring it into nonconduction, thus cutting off the main current path and stopping arc discharge.

Thus, in this embodiment, if arc discharge occurs during its use, the circuit elements are never damaged or destroyed by the large current due to the arc discharge. Low resistors are usually used as resistor R1 so that its power consumption during normal operation is minimized.

As described above, since this embodiment is composed by using a microcomputer as main circuit element, lighting devices bearing lamp-dimming function can be made with less circuit elements and this facilitates low-cost production of lighting devices with reduced sizes and weights. Furthermore, troubles in lamp dimming of lighting devices can be remarkably reduced because microcomputers are highly tolerable to aging, variation of temperature and instability of charge/discharge circuits using resistor and capacitor. In addition, this embodiment can be used with no special care in various regions which differ in the frequency of standard ac line because this embodiment bears zero-crossover detection function, inrush current-limiting function and arc discharge current-limiting function.

Effects of this invention will be explained hereinafter in conjunction with several experiments using lighting devices as shown in Example.

Experiment 1

Eight male volunteers, average age of 21 year old, were asked to enter in a room wherein six down lights as shown in Example had been provided on the ceiling, followed by the collection of 10 ml blood. The volunteers were then loaded with the Kraepelin census as visual task for one hour and immediately thereafter 10 ml blood was collected. The above operations were repeated on eight different volunteers.

The collected bloods were subjected to conventional immunoradiometric assay using "Allegro ACTH Kit-", an immunoradiametric kit commercialized by Nihon Medi-physics Co., Ltd., Hyogo, Japan, to determine their ACTH levels. The assay used $^{125}$I and avdin-binding bead respectively as the tracer and B/F separator, while in the assay, to determine the ACTH in plasm, the ACTH in blood specimen was first sandwiched with $^{125}$I-labelled antibody and biotin-binding antibody, then immobilized by forming an avidin-biotin complex with the avidin-binding bead.

In particular, the collected blood was subjected to centrifugation at a chilled temperature and the obtained plasma was collected and subjected as specimen to the assay. Thereafter, in numbered test tubes were placed 200 microliter aliquot of either specimen, distilled water or standard ACTH in distilled water, concentration of 15, 50, 150, 500 or 1,500 picograms/ml, and the resultant mixtures were added with 100 microliter aliquots of a prescribed anti-ACTH antibody-$^{125}$I solution. After mixing to homogeneity, the test tubes were added with one bead while inclining them by about 30°, sealed with paraffin film and subjected to about 20-hour standing at ambient temperature. The liquid parts in the test tubes were then completely removed by decantation and the beads were washed by adding in the test tubes 2 ml aliquots of a washing liquid which was attached to the assay kit and diluted by 12 times in distilled water prior to its use. The washing operation was repeated two times and the beads were determined for their radioactivity (cpm) using a liquid scintillation counter. After the determination, corrected counts for standard ACTH were calculated by subtracting the averaged count for ACTH-free distilled water from the counts for standard ACTH as determined at different concentrations. Then, a standard curve was prepared by plotting with concentrations of standard ACTH as abscissa against corresponding corrected counts as ordinates, and the amount of ACTH in specimen was read off from the standard curve using the corresponding corrected counts, thus determining the ACTH levels in the bloods from the volunteers.

In this Experiment, xenon gas-enclosed incandescent lamps enclosing xenon gas and nitrogen gas in the ratio of about 7:2 by volume in a soft glass bulb with a silica coated inner surface were used as luminous source for down lights and energized at dc 116 V using power sources with a circuit as shown in FIG. 1. The visual task was loaded under conditions where the volunteers were asked to sit in natural position at a working desk, while the illuminance during visual task was set to 550±701 ux on the working desk. The experiment was started at a prescribed time in early morning to keep the volunteers' physiologies in prescribed constant levels.

As control, a light (Control 1) obtained by energizing argon gas-enclosed incandescent lamps, rated voltage of 110 V, rated wattage of 100 W, at ac 110 V, and another light (Control 2) obtained by energizing three band radiation type fluorescent lamps, rated voltage of 100 V, rated wattage of 27 W, were tested similarly as above.

The obtained ACTH levels in human blood were put into the following equation to obtain the rate (%) of elevation for ACTH level due to the visual task.

$$\text{Elevation rate (\%)} = \frac{A - B}{B} \times 100$$

where "A" designates the ACTH level immediately after loading visual task, while "B" designates the ACTH level immediately before loading visual task.

The results were as shown in Table 1. The elevation rates (%) in Table 1 are the average of eight measurements, and Table 1 also lists for reference the color temperatures (K) and general color rendering indexes (Ra) for each luminous source as determined in usual manner.

TABLE 1

| Luminous source | Elevation rate (%) | Color temperature (K) | General color rendering index (Ra) |
|---|---|---|---|
| This invention | −21 | 2,900 | 100 |
| Control 1 | 5 | 2,600 | 100 |
| Control 2 | 30 | 5,900 | 84 |

As obvious from the results in Table 1, it was found that when a lighting device according to this invention was used, the elevation rate immediately after 1-hour visual task became distinctly low, i.e. −21% on average, in other words, substantially did not elevate or even reduced the ACTH level in human blood. This would suggest that the light from the lighting device of this invention hardly causes stress when used in illumination. As described above, the ACTH level in human blood has a diurnal variation where the ACTH level maximizes early morning and then gradually decreases towards midnight. The fact that in the experimental system using the lighting device of this invention, a reduced ACTH level was marked immediately after loading the visual task would suggest that the light from the lighting device was very natural and hardly disturbed human metabolism.

While in the case of Control 2 using three band radiation type fluorescent lamp, the elevation rate immediately after loading the visual task reached 30% on average, confirming that Control 2 remarkably elevated the ACTH level in human blood. In the case of Control 1 wherein argon gas-enclosed incandescent lamps were energized at rated ac voltage, a similar but not so remarkable tendency as found for Control 2 was noted and the delay rate immediately after loading the visual task was as much as about 5%.

The above results would support that among lights from various lighting devices, some lights elevates the ACTH level in human blood but some lights do not, as well as that the light from the lighting device of this invention substantially does not elevate the ACTHlevel in human blood when used in illumination. The fact that as is the case of Controls 1 and 2, some lights with a good general color rendering index (Ra) and those with a high color temperature and high total flux which have been deemed more effective to visually recognize articles as they really are substantially elevated the ACTH level in human blood would suggest that, in addition to continuity, flicker, color temperature and color rendering properties in lights, their energy distribution, waveform of energizing current, total luminous flux and composition of enclosed gases delicately influenced the occurrence of stress due to tasks including visual task.

Although in this experiment the volunteers were loaded with the Kraepelin census as visual task, the loading of other visual tasks such as document making task, book keeping task, drawing task, VDT task, chemical analysis, process management, color coordination, book reading and video watching led to similar tendencies. The results attained with krypton gas-enclosed incandescent lamp and argon gas-enclosed incandescent lamp were comparable or slightly inferior to those attained with xenon gas-enclosed lamp. In any type of these incandescent lamps, when the energizing voltages were ac or when they were dc but not higher than their rating or higher than about 130% thereof, the ACTH level in human blood substantially elevated.

In the below explained Experiment 2, the fact that there is a close relationship between the ACTH level in human blood and the occurrence of alpha-wave, in other words, between the ACTH level in human blood and the comfortableness of illumination will be clarified with an experiment wherein volunteers are loaded with a similar visual task as in Experiment 1 and then checked for the intensity and distribution of alpha-wave as observed after loading the visual task.

Experiment 2

Several biological electrodes were cephalically put on a volunteer, 21-year old, according to "10/20 Electrode System". The volunteer was then asked to enter with the electrodes on in a room wherein, similarly as in Experiment 1, six down lights as shown in Example have been provided on its ceiling, and then determined with "Model 1A97A", a mutipurpose electroencephalograph commercialized by NEC San-ei Instruments, Ltd., Tokyo, Japan, for his brain waves under eye-closing conditions which were then recorded in "Model XR-710", a data recorder commercialized by TEAC Corp., Tokyo, Japan. The volunteer was then loaded with the Kraepelin census as visual task similarly as in Experiment 1 for one hour and his brain waves immediately after loading the visual task were determined and recorded similarly as above. After the determination, the recorded data signals were subjected to both frequency and topological analyses using "Model 7T18A", a signal processor commercialized by NEC San-ei instruments, Ltd., Tokyo, Japan, to topolographycally represent the alpha-wave immediately after loading the visual task. The result was as shown in FIG. 3.

Figure 4:
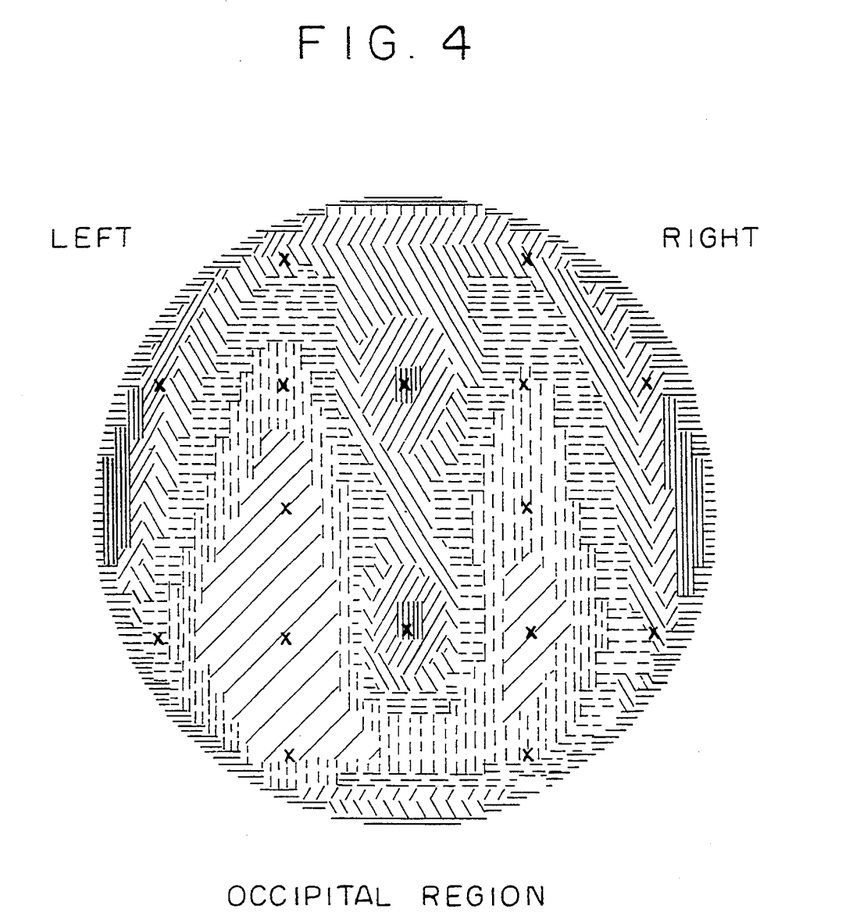
FIG. 4 is a topograph to show the occurrence of alpha-wave when visual task is loaded under the light (Control 1) which is obtained by energizing incandescent lamp at its rated ac voltage.

Similarly as in Experiment 1, xenon gas-enclosed incandescent lamps enclosing xenon gas and nitrogen gas in the ratio of about 7:2 by volume in a soft glass bulb with a silica coated inner surface were used as luminous source for the down lights and energized at dc 116 V using a power source with a circuit as shown in FIG. 1. As control, a light (Control 1) obtained by energizing argon gas-enclosed incandescent lamps, rated voltage of 110 V, rated wattage of 100 W, at ac 110 V, and another light (Control 2) obtained by energizing three band radiation type fluorescent lamps, rated voltage of 100 V, rated wattage of 27 W, were tested similarly as in Experiment 1. The results were as shown in FIGS. 4 and 5.

Figure 3:
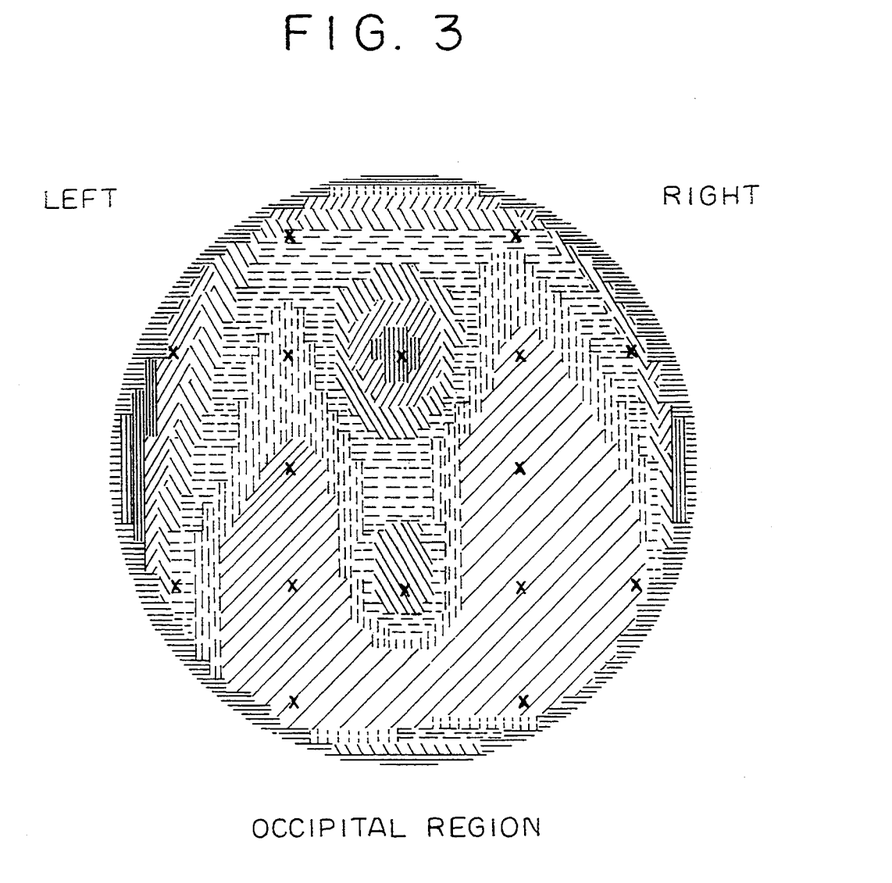
FIG. 3 is a topograph to show the occurrence of alpha-wave when visual task is loaded under the light emitted by a lighting device according to this invention.

As shown in FIG. 3, when the visual task was loaded under illumination using a lighting device according to this invention, an extensive and strong distribution of alpha-wave was observed around the volunteer's occipital region. Human brain waves are grouped into four types with respect to their frequency, i.e. alpha-, beta-, delta- and theta-waves, which are all strongly influenced by human physiology and psychology. In particular it is known that human psychology is in more comfortable state, human alpha-wave more strongly and extensively appears around the occipital region. Thus, the result in FIG. 3 would suggest that the light from the device of this invention hardly caused stress when used in illumination and helped the volunteer to comfortably carry out the visual task.

Figure 5:
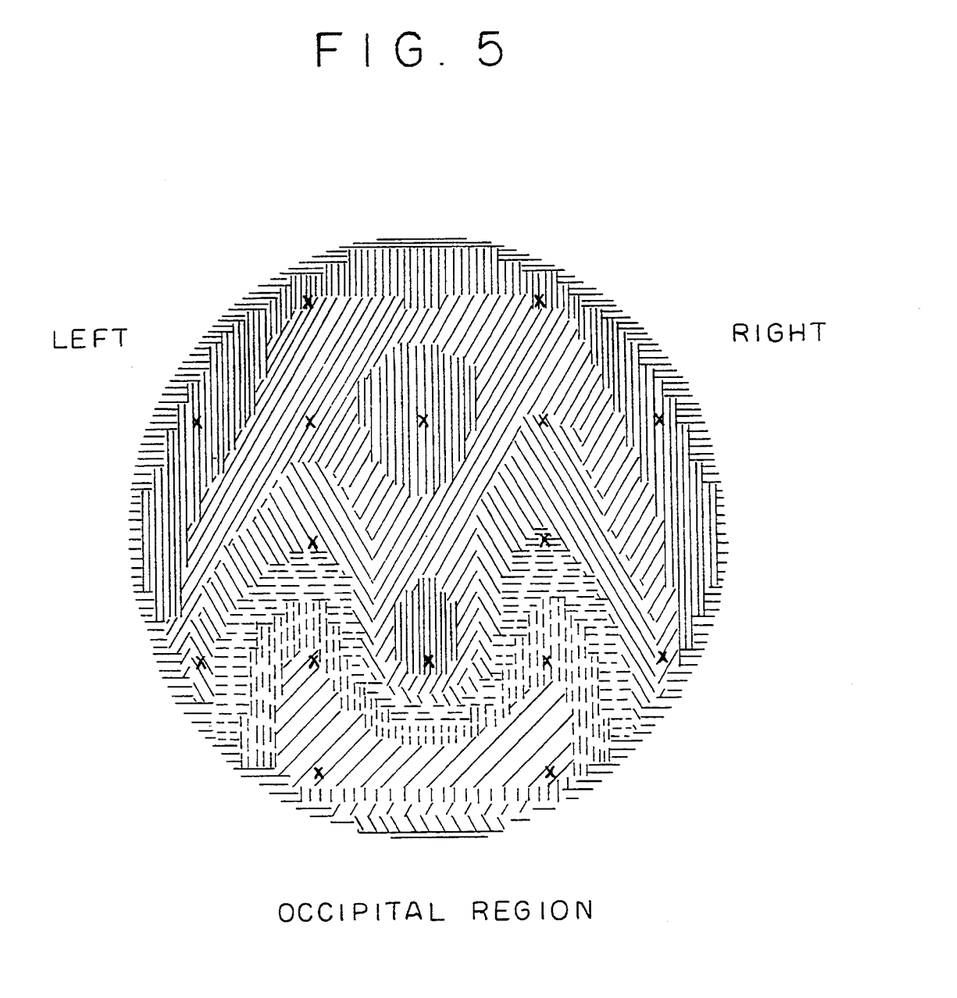
FIG. 5 is a topograph to show the occurrence of alpha-wave when visual tasks is loaded under the light (Control 2) which is obtained by energizing three band radiation type fluorescent lamp at its rated ac voltage.

While in the case of Control 2 wherein three band radiation type fluorescent lamp was energized at its rated ac voltage, as shown in FIG. 5, the alpha-wave as observed immediately before loading the visual task distributed remarkably less weakly and extensively than in the case of this invention, suggesting that Control 2 was causative of stress and inferior in comfortableness when used in illumination. As shown in FIG. 4, Control 1 wherein incandescent lamp was energized at its rated ac voltage marked a distribution of alpha-wave which was not so inferior as that in Control 2 but significantly weaker and less extensive in comparison with this invention.

The above results are well consistent with the relationship between the type of luminous sources and the elevation rate for the ACTH level in human blood. This would support that the elevation of ACTH level in human blood has a close relationship with the occurrence of stress, in other words, with comfortableness of illumination, as well as that as is the case of this invention, lights which substantially do not elevate the ACTH level in human blood hardly cause stress and help the users to comfortably carry out visual tasks.

In addition to the visual tasks as explained in Experiments 1 and 2, we further studied the ACTH level in human blood and distribution of alpha-wave when workers and operators were actually loaded with practical visual tasks such as document making task, book keeping task, drawing task, VDT task, chemical analysis, process management and color coordination, confirming that the lighting device of this invention was significantly superior to both Controls 1 and 2. This would suggest that the lighting device of this invention is very effective in the improvement of stress causability and comfortableness in visual tasks.

As described above, the lighting device of this invention emits a light which substantially does not elevate the ACTH level in human blood. This means that the lighting device of this invention hardly causes stress when used in illumination.

Thus, the lighting device of this invention is suitable in the illumination for visual tasks such as document making task, book keeping task, drawing task, VDT task, chemical analysis, process management, book reading and TV and video watching which need excessive tensions in the workers' and operators' optic nerves, as well as for color coordination in designing, dress making and architecture and also for expert judgement on paintings, antiques and jewels which all need careful distinction of colors. When the lighting device of this invention is used in such a visual task, the users can comfortably carry out the visual task because the lighting device hardly causes stress in the users even when the visual tasks need a relatively long working or operation time.

In addition, since the light from the device of this invention induces alpha-wave in human brain waves, the device is suitable for lighting devices directed to comfortable illuminated spaces, as well as, for example, in conferences and meetings which need creative opinions and precise judgements and also in creative jobs such as story writing, painting and scientific researches which need creative power and concentration.

We claim:

1. In a lighting device using an incandescent lamp as a luminous source, the improvement wherein said device comprises an incandescent lamp, with a rated wattage in the range of 40–100 w, which consists essentially of nitrogen gas together with a gas chosen from a group consisting of xenon and krypton gases in an amount exceeding approximately 15% by volume but not exceeding approximately 80% by volume and has an internal glass-bulb pressure of 700 to 800 torr when in incandescent state, and a power source which is capable of supplying to said incandescent lamp a dc voltage in the range of 105 to 130% of the rating of said incandescent lamp and has an output terminal connected to said incandescent lamp whereby said incandescent lamp is capable of emitting a light which does not substantially elevate the adrenocorticotrophic hormone level in human blood when energized at said dc voltage.

2. The device of claim 1, wherein said power source comprises a rectifier circuitry to convert ac into dc, said rectifier circuitry having an input terminal connected with an ac source and also having an output terminal connected with an incandescent lamp;

a controlled rectifier having a main current path connected between said ac source and said rectifier circuitry;

and a phase control circuitry having an output terminal connected with a control electrode constituting means to control the conduction of said controlled rectifier based on the time interval between zero-crossovers in said ac source.

3. The device of claim 2, wherein said rectifier circuitry comprises smoothing means.

4. In a method for emitting a light with an incandescent lamp as a luminous source, the improvement wherein said method comprises providing an incandescent lamp, rated wattage of 40–100 w, capable of emitting a light which does not substantially elevate the adrenocorticotrophic hormone level in human blood when energized at a dc voltage in the range of about 105–130% of the rating of said incandescent lamp;

and energizing said incandescent lamp by a power source capable of supplying such a dc voltage to said incandescent lamp to emit said light.

5. The method of claim 4, wherein said incandescent lamp is a member selected from the group consisting of a krypton gas-enclosed lamp and an argon gas-enclosed lamp.

6. The method of claim 4, wherein said incandescent lamp is a xenon gas-enclosed lamp.

7. The method of claim 6, wherein said xenon gas-enclosed lamp encloses a filling composition which contains xenon gas in an amount more than about 15% by volume but less than 80% by volume.

8. A method of preventing the substantial elevation of the adrenocorticotrophic hormone level in human blood comprising providing incandescent lighting to emit light which does not substantially elevate the adrenocorticotrophic hormone level in human blood;

energizing said incandescent lighting at a dc voltage in the range of about 105–130% of its rating;

performing visual tasks in the emitted light of said incandescent lighting without a substantial elevation of the adrenocorticotrophic hormone level in human blood.

9. In a lighting device using an incandescent lamp as a luminous source, the improvement wherein said device comprises an incandescent lamp with a rated wattage in the range of 40–100 w, said incandescent lamp enclosing a gas which consists essentially of nitrogen gas, together with a gas choseb from a group consisting of xenon and krypton gases in an amount exceeding approximately 15% by volume but not exceeding approximately 80% by volume, and said incadescent lamp has an internal glass-bulb pressure of 700 to 800 torr when in an incandescent state; and a power source which is capable of supplying to said incandescent lamp a dc voltage in the range of 105 to 130% of the rating of said incadescent lamp, and said power source has an output termnal connected to said incadescent lamp, said incandescent lamp being capable of emitting a light which does not substantially elevate the adrenocorticotropic hormone level in human blood when energized at said dc voltage.

* * * * *